United States Patent [19]
Brian

[11] Patent Number: 5,155,670
[45] Date of Patent: Oct. 13, 1992

[54] BOOTSTRAP MODIFIED TOPOLOGIES FOR WIDE-INPUT RANGE SWITCHMODE DC TO DC CONVERTERS

[76] Inventor: Matley J. Brian, 11890 East Pradera Rd., Camarillo, Calif. 93012

[21] Appl. No.: 764,631

[22] Filed: Sep. 24, 1991

[51] Int. Cl.⁵ .......................................... H02M 3/335
[52] U.S. Cl. ....................................... 363/24; 363/98; 363/132; 323/299
[58] Field of Search ..................... 363/17, 20, 21, 24, 363/25, 26, 95, 97, 98, 131, 132, 133, 56, 61; 323/299

[56] References Cited

U.S. PATENT DOCUMENTS

| | | | |
|---|---|---|---|
| 4,502,104 | 2/1985 | Mitchell | 363/26 |
| 4,594,649 | 6/1986 | Rhoads et al. | 363/21 X |

*Primary Examiner*—Emanuel T. Voeltz
*Attorney, Agent, or Firm*—Albert O. Cota

[57] ABSTRACT

A bootstrap circuit that operates in combination with switchmode DC to DC converter topologies that are based on forward (10), half-bridge/full-bridge (40) and flyback (60) configurations. Each configuration consists of an output circuit (18) and a bootstrap modified input circuit (12) that further consists of a bootstrap circuit (14) and a converter input circuit (16). The bootstrap function is achieved by charging a bootstrap inductor (L1) from current derived from the input voltage source and subsequently discharging the inductor through a bootstrap capacitor (C1) where an augmented voltage that is higher than the input voltage is developed. The converter then operates from the augmented voltage rather than from the input voltage. Thus, the invention is able to provide a constant output when operated over a wide-input voltage range while at the same time reducing the voltage stresses on the converter's primary switches and output rectifiers. Furthermore, reduction of input RF noise is accomplished by judicious choice of size and location of the bootstrap capacitor C1.

16 Claims, 11 Drawing Sheets

BOOTSTRAP-FORWARD DC TO DC CONVERTER

BOOTSTRAP-FORWARD DC TO DC CONVERTER

FIG 6  BOOTSTRAP HALF-BRIDGE DC TO DC CONVERTER

FIG 9 BOOTSTRAP FULL-BRIDGE DC TO DC CONVERTER

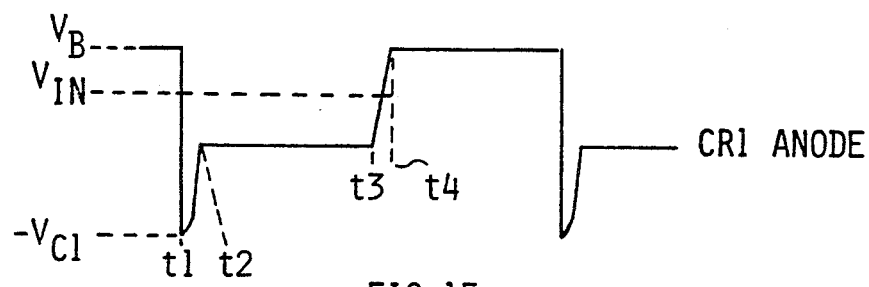
FIG 15 — CR1 ANODE
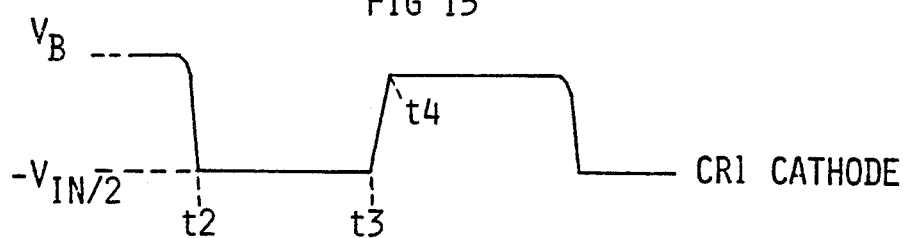
FIG 16 — CR1 CATHODE
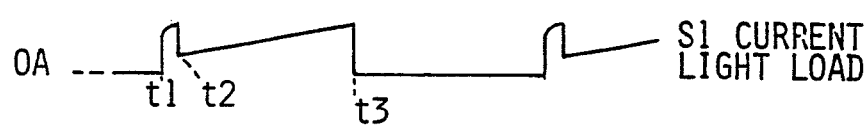
FIG 17 — S1 CURRENT LIGHT LOAD
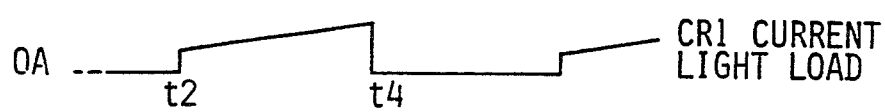
FIG 18 — CR1 CURRENT LIGHT LOAD
FIG 19 — S1 CURRENT FULL LOAD
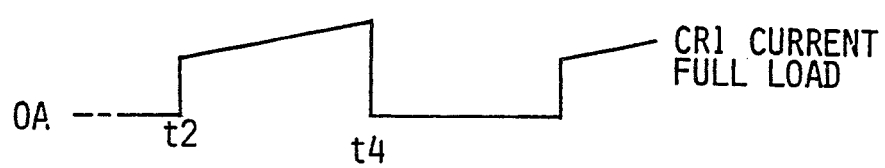
FIG 20 — CR1 CURRENT FULL LOAD

BOOTSTRAP MODIFIED TOPOLOGIES FOR WIDE-INPUT RANGE SWITCHMODE DC TO DC CONVERTERS

TECHNICAL FIELD

The invention pertains to the general field of switching mode DC to DC converters and more particularly a switchmode converter which functions with a bootstrap circuit to allow operation over a wide range of input voltage levels.

BACKGROUND ART

The majority of electronic equipment throughout the world operates from alternating current voltage supplied by a utility company. In most such equipment, the supply voltage is inputted into a power supply, which might be of the increasingly popular line-operated AC to DC switching converter type. The supplied voltage may have different nominal voltage levels depending upon the part of the world in which the equipment is located. North American voltages are typically 115 volts, with tolerances which may allow it to decrease to 90 volts. In contrast, voltages in Japan are nominally 100 volts, but may decrease below 90 volts with tolerances included. Voltages in many European or African countries are nominally 220 volts, with tolerances allowing the voltage to rise above 260 volts. Moreover, the input voltage requirements expected of many DC to DC converters may be for wide ranges that even exceed that of AC line operated power supplies. Input ratios of as high as eight to one are currently in use.

Manufacturers of electronic equipment are finding it economically attractive to procure, stock and manufacture their product with a single power supply which can operate without adjustment from any nominal AC voltage found anywhere in the world. Thus, wide range input power supplies which can operate from 90 volts AC to 264 volts AC without adjustment are becoming highly desirable.

It is feasible to design a power supply of conventional technology to operate from 90 to 264 VAC (imposing essentially 100 to 375 volts DC from the rectifier section to the input of the DC to DC converter part of a line operated power supply). However, selection of the converter operating point to minimize conduction losses at the low voltage level requires the compromise of imposing high voltage stresses at the high voltage levels. This effect is especially severe with the so-called "buck derived" or forward converters, where the voltage stresses on the rectifiers and switching elements varies essentially as double the input voltage. Therefore, doubling the line voltage doubles the voltage stresses. A switching element with 200 volts stress at low line conditions must withstand about 750 volts at high line conditions. Components with optimized operating parameters over this wide range of voltage stress are too expensive for economical commercial power supplies. Thus, designers must compromise performance in order to utilize commercially priced components.

In view of the popularity of wide range input power supplies, and mindful of the voltage stresses in conventional topologies on switches and rectifiers which vary typically as twice the variation of the input voltage, a converter wherein the voltage stress changes with input change are less than linearly proportional to increases in the input voltage would be extremely useful.

The present invention teaches a novel bootstrap operation which allows the switching and rectifying elements of otherwise essentially familiar DC to DC converters to experience a greatly reduced voltage stress increase with increasing input voltage. In the present invention, the voltage stress on the switches and rectifiers varies directly with input change, plus a small essentially constant value that is equal to the magnitude of the voltage stress at minimum input voltage. In this manner, input voltage changes of eight to one result in a voltage stress increase of five to one, as opposed to an eight to one increase, as would be the case with a conventional forward converter.

DISCLOSURE OF THE INVENTION

According to the present invention, a bootstrap function is achieved which operates in conjunction with DC to DC converter topologies that are based on forward, half-bridge, bridge and flyback converters. The bootstrap function is achieved by charging a bootstrap inductor with current from the input source, and discharging the inductor to a bootstrap capacitor which thereby develops a voltage that is higher than the voltage of the input source. The DC to DC converter based on the forward, half-bridge, bridge or flyback topology then operates from the bootstrap augmented input voltage, rather than directly from the input voltage.

The bootstrap voltage remains essentially constant and is determined by a transformer turns ratio of the regulated converter output voltage. Therefore, the input voltage to the converter is simply the sum of the rectified AC input voltage and the bootstrap voltage. This yields the distinct advantage that the change in voltage stress on the active converter components, as the AC line voltage changes, is related only to the direct line voltage change.

The charging of the bootstrap inductor is achieved by switching the converter input voltage source across it periodically by the closure of a switching component, which is also the switching component that regulates the switching converter itself. Thus, one switching function performs two electrical functions, resulting in simplicity of the overall converter. Discharge of the bootstrap inductor into the bootstrap capacitor occurs when the switching element opens.

In pulse width modulated switching regulated DC to DC converters, the output voltage is a function of the duty cycle or duty ratio of the switching component or components of the converter. This same duty ratio also governs the operating relationship of the bootstrap inductor and bootstrap capacitor, such that the voltage across the bootstrap capacitor remains at a constant value above the input voltage to the converter.

BRIEF DESCRIPTION OF THE DRAWINGS

FIG. 15 illustrates operating waveform diagrams for the embodiment of FIG. 10.

FIG. 16 illustrates operating waveform diagrams for the embodiment of FIG. 10.

FIG. 17 illustrates operating waveform diagrams for the embodiment of FIG. 10.

FIG. 18 illustrates operating waveform diagrams for the embodiment of FIG. 10.

FIG. 19 illustrates operating waveform diagrams for the embodiment of FIG. 10.

FIG. 20 illustrates operating waveform diagrams for the embodiment of FIG. 10.

BEST MODE FOR CARRYING OUT THE INVENTION

The best mode for carrying out the bootstrap modified topologies for wide-input range switchmode DC to DC converters is presented in terms of a first, second, and third embodiment. The three embodiments are respectively entitled: bootstrap-forward DC to DC converter 10, bootstrap half-bridge DC to DC converter 40, and bootstrap-flyback DC to DC converter 60. All three bootstrap topologies are designed to allow a conventional switchmode DC to DC converter to operate efficiently and reliably over a wide range of input voltage levels.

Figure 1:
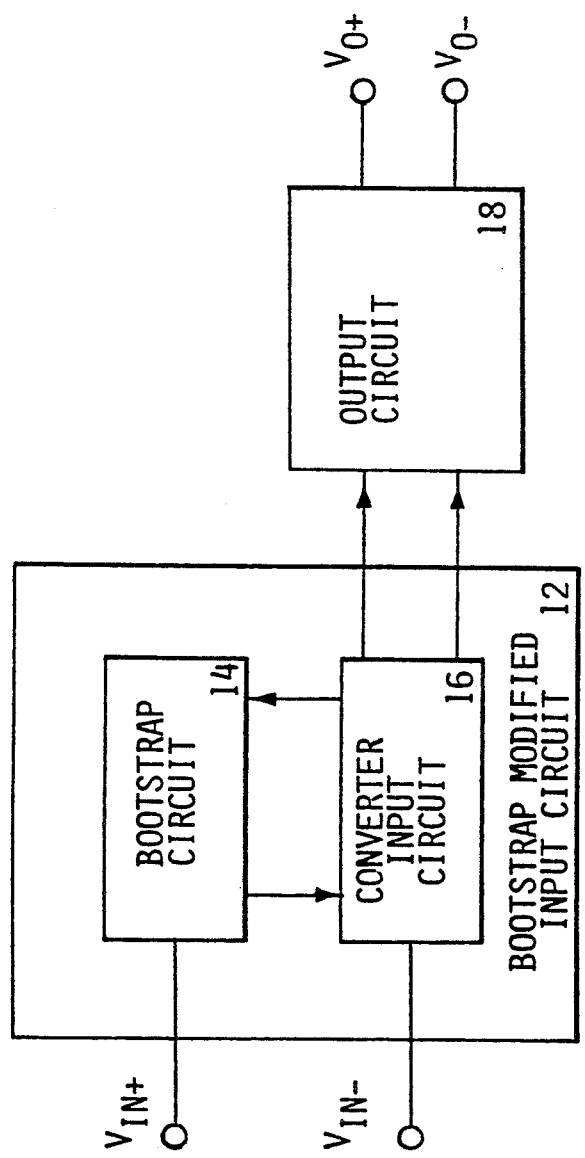
FIG. 1 is a block diagram of the basic design of a bootstrap modified topologies for wide-input range DC to DC converters.

In its basic design applicable to all embodiments, the bootstrap modified topologies for wide-input range switchmode DC to DC converters as shown in FIG. 1, is comprised of a bootstrap modified input circuit 12 and an output circuit 18. The circuit 12 further consists of a bootstrap circuit 14 and a converter input circuit 16.

The input to the circuit 12 is a rectified DC voltage $V_{IN+}$ and $V_{IN-}$ that may be a rectified voltage derived from the AC voltage supplied from a utility company. The $V_{IN+}$ voltage is applied to the bootstrap circuit 14 which has the means for automatically increasing $V_{IN+}$ to a higher DC voltage. The circuit 16 has the means for receiving the return $V_{IN-}$ voltage and for receiving and converting the higher DC voltage from the circuit 14 to an AC voltage. The AC voltage is applied to the output circuit 18 where depending on its design, has the means for producing either a DC or an AC output voltage. The AC voltage would typically be used to power an electronic ballast of the type used in fluorescent light fixtures.

In the descriptions that follow, the bootstrap circuit 14 is identical in all embodiments; the converter input circuit 16 and output circuit 18 are modified to provide the required design output.

Figure 2:
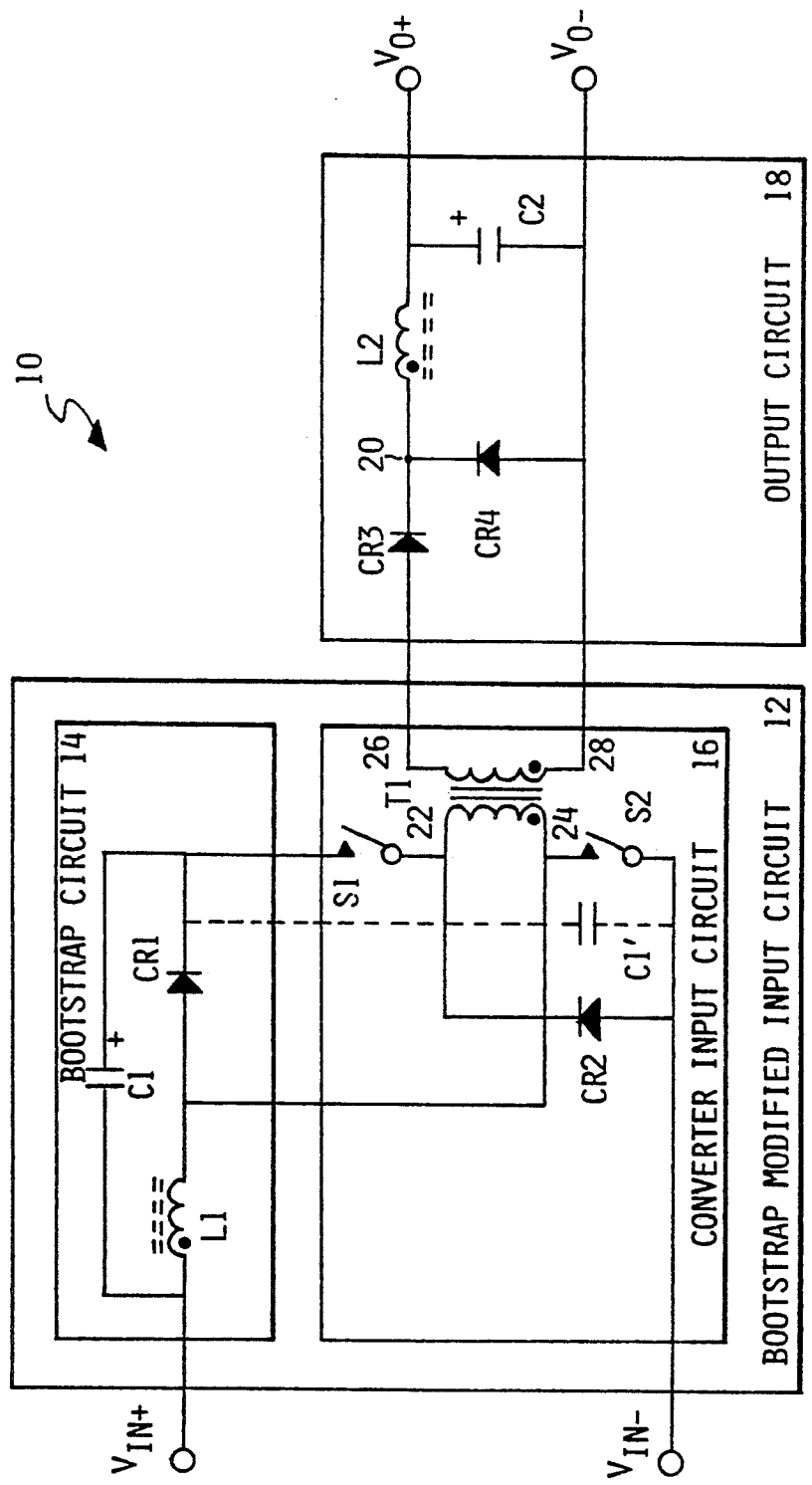
FIG. 2 is a schematic diagram illustrating the bootstrap-forward DC to DC converter embodiment of the present invention.
Figure 3:
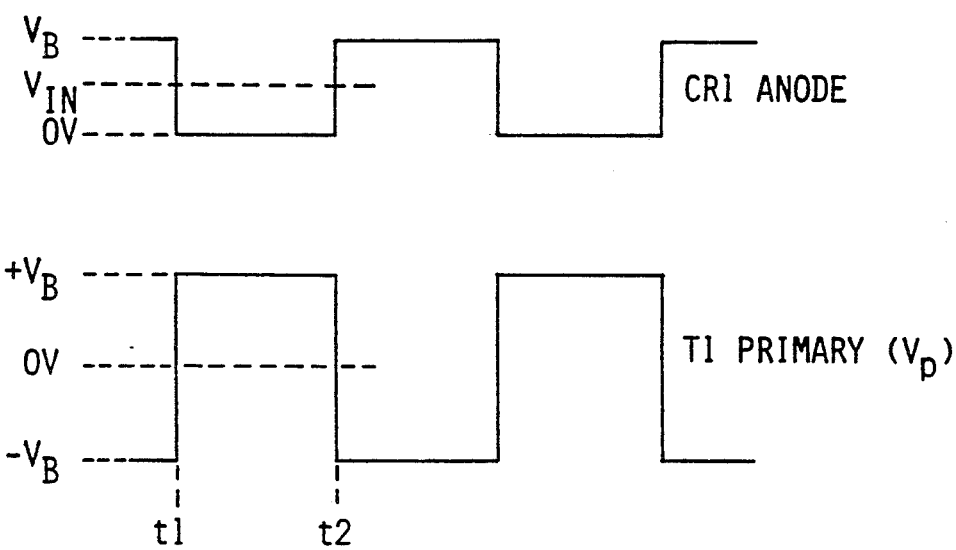
FIG. 3 illustrates typical low line operating waveform diagrams for the embodiment of FIG. 2.
Figure 4:
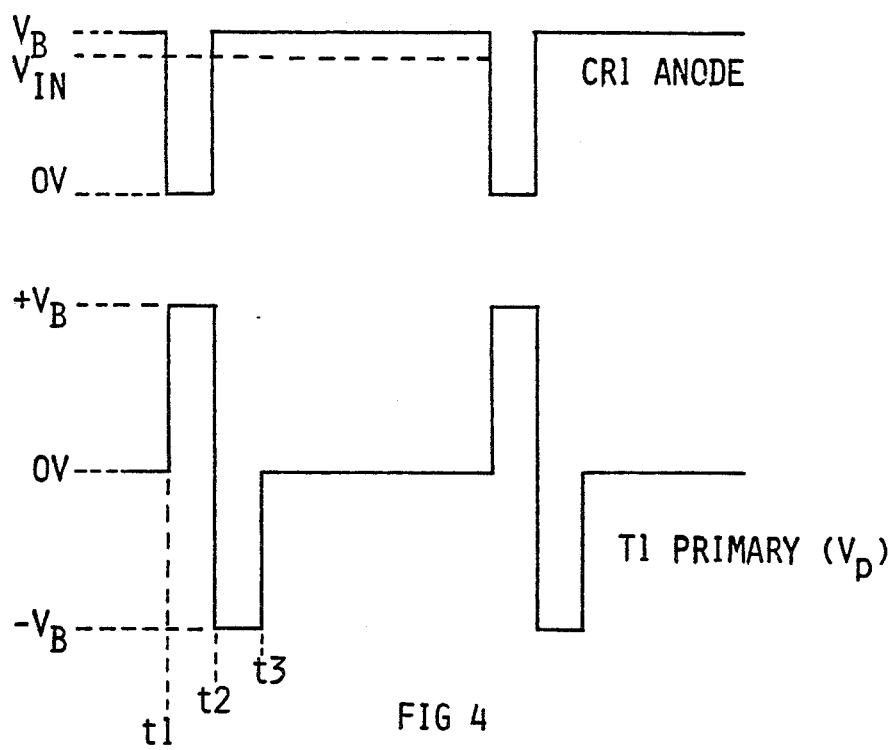
FIG. 4 illustrates typical high line operating waveform diagrams for the embodiment of FIG. 2.

The bootstrap-forward DC to DC converter 10 is shown in FIG. 2 and its applicable waveforms are shown in FIGS. 3 and 4. This first embodiment is comprised of a bootstrap modified input circuit 12 and an output circuit 18. The circuit 12 further consists of a bootstrap circuit 14 and a converter input circuit 16. The circuit 14 includes a bootstrap inductor L1, a first rectifier CR1 and a bootstrap capacitor C1; the circuit 16 includes a transformer T1, a pair of switches S1 and S2 that preferably consist of FET transistors, and a second rectifier CR2. The circuit 18 includes a back-to-back output rectifier consisting of a third rectifier CR3 and a fourth rectifier CR4, an output inductor L2 and on output capacitor C2.

As shown in FIG. 2, the input to the circuit 12 is $V_{IN+}$ and $V_{IN-}$ which is a rectified DC voltage that is supplied from a conventional DC voltage source such as a rectified AC line voltage.

In the bootstrap circuit 14, the bootstrap inductor L1 is connected in series between the input voltage $V_{IN+}$ and the anode of the first rectifier CR1. Connected across the $V_{IN+}$ and the cathode of the first rectifier is the bootstrap capacitor C1.

The converter input circuit 16 includes the transformer T1 which functions to provide isolation and voltage step-down. The transformer's primary winding has a first end 22 and a second end 24 and its secondary winding also has a first end 26 and a second end 28. The first switch S1 is connected in series between the first end 22 of the primary winding of T1 and the junction formed with the cathode of the first rectifier CR1 and the bootstrap capacitor C1. The second switch is likewise connected in series between the second end 24 of the T1 primary winding and the common input voltage line that receives $V_{IN-}$. The second rectifier CR2 is connected between the first end 22 of transformer T1 and the input voltage line $V_{IN-}$.

The output circuit 18 consists of the back-to-back output rectifiers CR3 and CR4. The cathode of both rectifiers form a junction 20 and the anode of the third rectifier CR3 is connected to the first end 26 of the secondary winding of transformer T1. The anode of the fourth rectifier CR4 is connected to the second end 28 of transformer T1 which is also connected to the output voltage line $V_{O-}$. The output inductor L2 is connected in series between the cathode junction 20 and the output voltage line $V_{O+}$. To complete the circuit 18, the output capacitor C2 is connected across the DC output voltage terminals $V_{O+}$ and $V_{O-}$. The capacitor C2 functions as an output storage and filtering capacitor and reduces high frequency ripple at the output.

Figure 5:
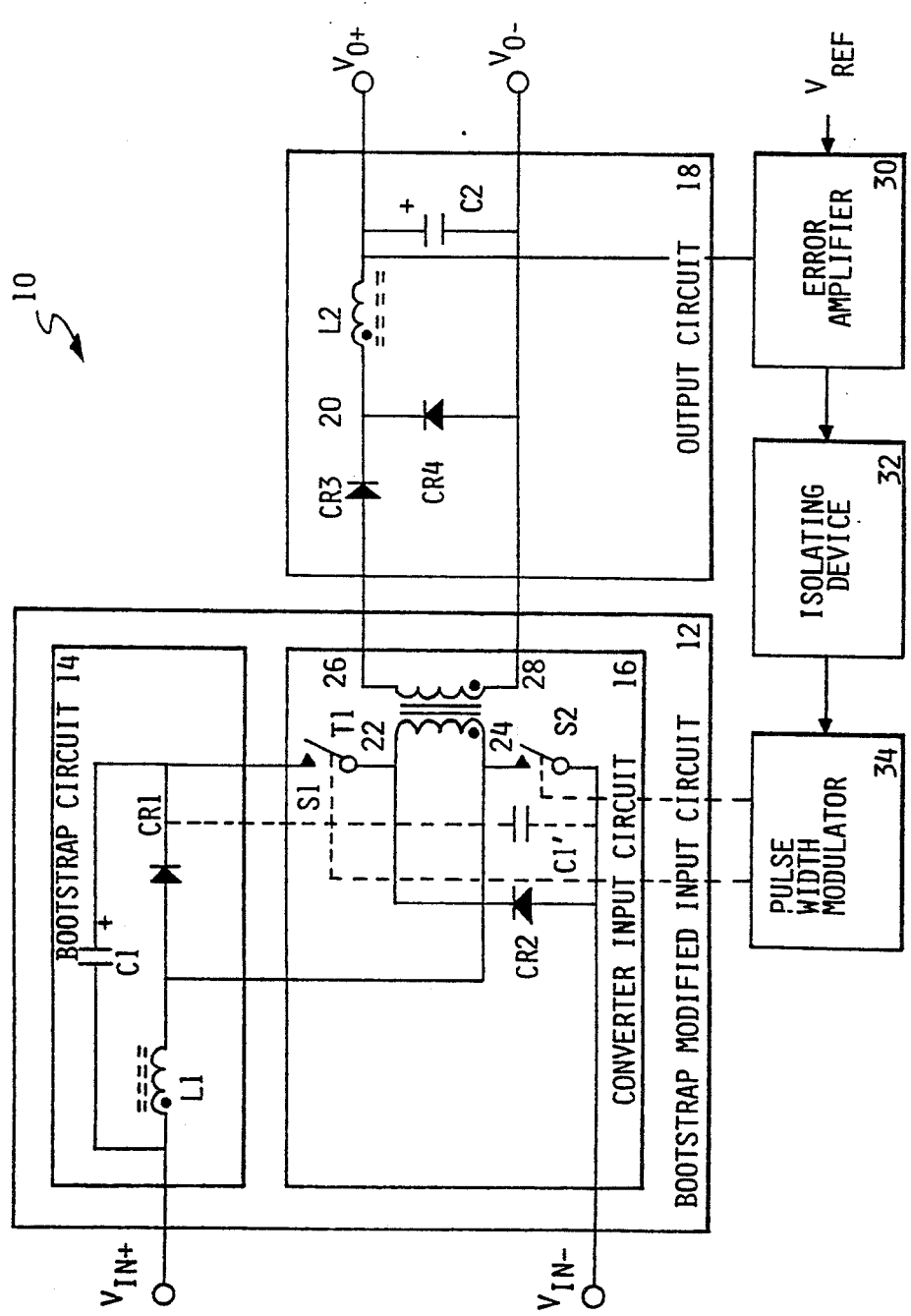
FIG. 5 is a schematic diagram illustrating the embodiment of FIG. 2 employing a conventional pulse width modulating technique.

In operation, S1 and S2 are opened and closed simultaneously in response to signals so that the switching action of the switches achieves pulse width modulation of the converter output. When the switches are closed, current through C1 flows through the primary of T1. The closed switches induce a voltage on the T1 secondary winding which forward biases the secondary connected rectifier CR3 at which time, the common connected rectifier CR4 is reversed biased. The secondary voltage through the back-to-back rectifier acts on L2 to cause current to flow. When switches S1 and S2 open, current through the T1 primary ceases, causing the voltage in T1 to reverse, so the third rectifier CR3 becomes reverse biased. The current in L2 now flows through the common connected fourth rectifier CR4 so that current continues to flow to the load. If a higher voltage or more current to the load is required, the switch closed portion of the duty cycle is increased for as long as necessary to achieve the desired increase. For a decrease in voltage or output current, the switch closed portion of the duty cycle is decreased. A control circuit means, as shown in FIG. 5, which is described later herein, determines the duty cycle of the switches for the purpose of regulating the output voltage to an essentially fixed value.

The first embodiment provides for the presence of C1, L1, and CR1, and their operation with respect to the closed and open times (duty ratio) of the switching elements S1 and S2. When switches S1 and S2 close, not only is energy transferred to the secondary through the transformer T1, but also inductor L1 is charged. Closure of S1 connects the positive side of C1 across the primary of T1, and the simultaneous closing of S2 completes the current path of the primary to return. Also, closure of S2 connects the anode of CR1 to common, which reverse biases CR1. The full input voltage $V_{IN+}$ then appears across L1. This voltage tends to increase the current flowing in L1. Under these conditions, the primary current of T1 flows through S1, and S2 conducts both the T1 primary current and the L1 current. When the switches open, current can no longer flow through the primary of T1, so the inductor current flows through L1 into C1, whereby C1 is charged. The next time the switches are closed, the charge flows out of C1, through the switches, and through the primary winding of T1, allowing energy stored in C1 to be transferred to the converter secondary.

The bootstrap capacitor C1 should have sufficient capacity to supply energy to the transformer without a voltage decrease to interfere with converter operation. Also, inductor L1 must be sized to have an energy storage capacity to provide sufficient current to C1 for satisfactory converter operation. L1 would normally operate in the continuous conduction mode for conditions where L2 would be in continuous conduction mode, and, in fact, L1 and L2 could advantageously be wound as separate windings on a common core to achieve the so-called "coupled inductor" that is finding popularity in the switching converter art in general.

The converter operation described above transfers energy to the output according to a transfer function that is identical to that of the conventional "forward-DC to DC converter"; that is, that the output voltage is the converter input voltage times the turns ratio of T1 times the duty ratio. Converter input voltage, however, is the voltage across C1 added to the input voltage. This sum of converter input voltage plus bootstrap capacitor voltage is termed the "bootstrap" voltage.

During steady state converter operation, the duty cycle that achieves regulated output voltage will also tend to fix the voltage across the capacitor C1 to a constant value that is related to the converter output voltage. This is determined from the operating points of the converter such that the voltage across C1 is equal to half the value of the voltage across T1 when the converter is operating at a 50 percent duty ratio. This voltage across C1 remains fixed at this value over varying input voltages since the duty ratio changes commanded by the control circuit to regulate the output also tend to regulate the voltage across C1 to the aforementioned constant value. Considering this constant voltage, it is theoretically possible to sense the converter output voltage across C1, thereby avoiding the complexity of measuring the output voltage on the secondary side and transmitting it to the primary across an isolation device.

Rectifiers CR1 and CR2 serve as the current path for discharging the magnetizing current of the transformer T1 when the switches open. During the switches open portion of the duty cycle, the transformer polarity reverses as the magnetizing field collapses. The dotted end of the transformer windings becomes positive in polarity, and since the switches are open, the only current path for the magnetizing current is through CR2, through the transformer primary, through CR1 and into C1. Thus, the transformer demagnetizing voltage is clamped to essentially the voltage at the positive end of C1, which is the bootstrap voltage. As the DC input voltage to the converter increases, the bootstrap voltage only increases as a function of the input voltage plus the constant voltage across C1. This results in a favorable situation with respect to voltage stress on S1, S2 and especially CR4 over wide range changes in the input voltage $V_{IN}$.

FIG. 2 also illustrates with dotted lines, a capacitor C1' (C1 prime). This capacitor is simply the capacitor C1 connected in a different location in the circuit that is, between the cathode of the first rectifier CR1 and the input voltage line $V_{IN-}$. If C1 is used, then C1' can be reduced in size or eliminated without adversely affecting operation of the invention. There are, however, some operating advantages to locating the bootstrap capacitor in the C1' position as opposed to the C1 position. When the bootstrap capacitor is located in the C1 position, opening of S1 and S2 causes L1 current to circulate in C1, thereby charging it. However, simultaneously, current flow in the input common conductor ceases. This results in discontinuous primary current, and probably imposes a requirement for significant input filtering to minimize differential mode noise. If the bootstrap capacitor is placed in the C1' position, the opening of S1 and S2 causes current flow in C1', which sustains current flow in the input common, since C1' is connected to common across the transformer. The result is continuous current in the input circuit, thus greatly reducing the requirement for differential mode filtering.

If the minimum voltage operating point of the converter is selected to be 50 volts Dc ($V_{IN}$=50 VDC), then the duty cycle of the converter will be 50 percent at $V_{IN}$=50. However, when $V_{IN}$=50 volts, the voltage across C1 is also 50 volts, therefore, the voltage across the primary of T1 (the bootstrap voltage) will be 100 volts when S1 and S2 are closed. The transformer's secondary winding will have a peak voltage that is equal to $2V_O$. If the input voltage increases to say, 400 volts, the voltage across the primary of T1 when the switches are closed will only increase to $V_{IN}$ plus $V_{C1}$, or 400+50=450 volts. Thus, an 8 times increase in the input voltage resulted in only a 4.5 to 1 increase in the voltage stress on the switches and output rectifier CR4.

Thus, one of the main and important objects of the invention can now be clearly seen. The voltage stress on the active elements (switches and output rectifiers) of a converter, where the input voltage varies over a wide range, can be advantageously minimized.

Control of the converter can easily be obtained by any one of the many conventional pulse width modulation techniques, such as the one illustrated in FIG. 5. In this figure, an error amplifier 30 senses the output voltage and compares it to a reference voltage $V_{ref}$. If the output voltage varies for any reason (input voltage changes, load changes, etc.), the error amplifier 30 sends a correction signal through an isolating device 32 to a pulse width modulator 34. The pulse width modulator 34 increases or decreases the duty ratio of S1 and S2 to correct the error and maintain the output voltage constant.

FIG. 5 illustrates some of the operating waveforms of the converters of FIGS. 2 and 3. FIG. 3 illustrates operating waveforms for minimum input voltage of the converter. The upper waveform of FIG. 3 illustrates the anode voltage of CR1. At time t1, S1 and S2 close and the CR1 anode is pulled from Vb (bootstrap voltage) to 0 volts (input common or return). The lower waveform shows that at the same time t1, closure of S1 places the full bootstrap voltage across the T1 primary. At t2, the anode of CR1 rises up to the bootstrap voltage as S2 opens, and the primary of T1 reverses voltage to a negative value equal to the bootstrap voltage as the T1 demagnetizes to C1 through CR1, as previously described.

FIG. 4 illustrates the same waveforms as FIG. 3, except that the converter waveforms of FIG. 4 represent converter operation at an input voltage considerably increased over the input voltage for FIG. 3. Notice that for FIG. 4, the time difference between t1 and t2 is much shorter, indicating a reduced duty ratio. However, the anode voltage of CR1 during the switch open time has only increased by the amount of increase of the input voltage. The primary of T1 still receives the bootstrap voltage during the switch closed time, and demagnetizes to the negative of the bootstrap voltage during the switch open time.

Figure 6:
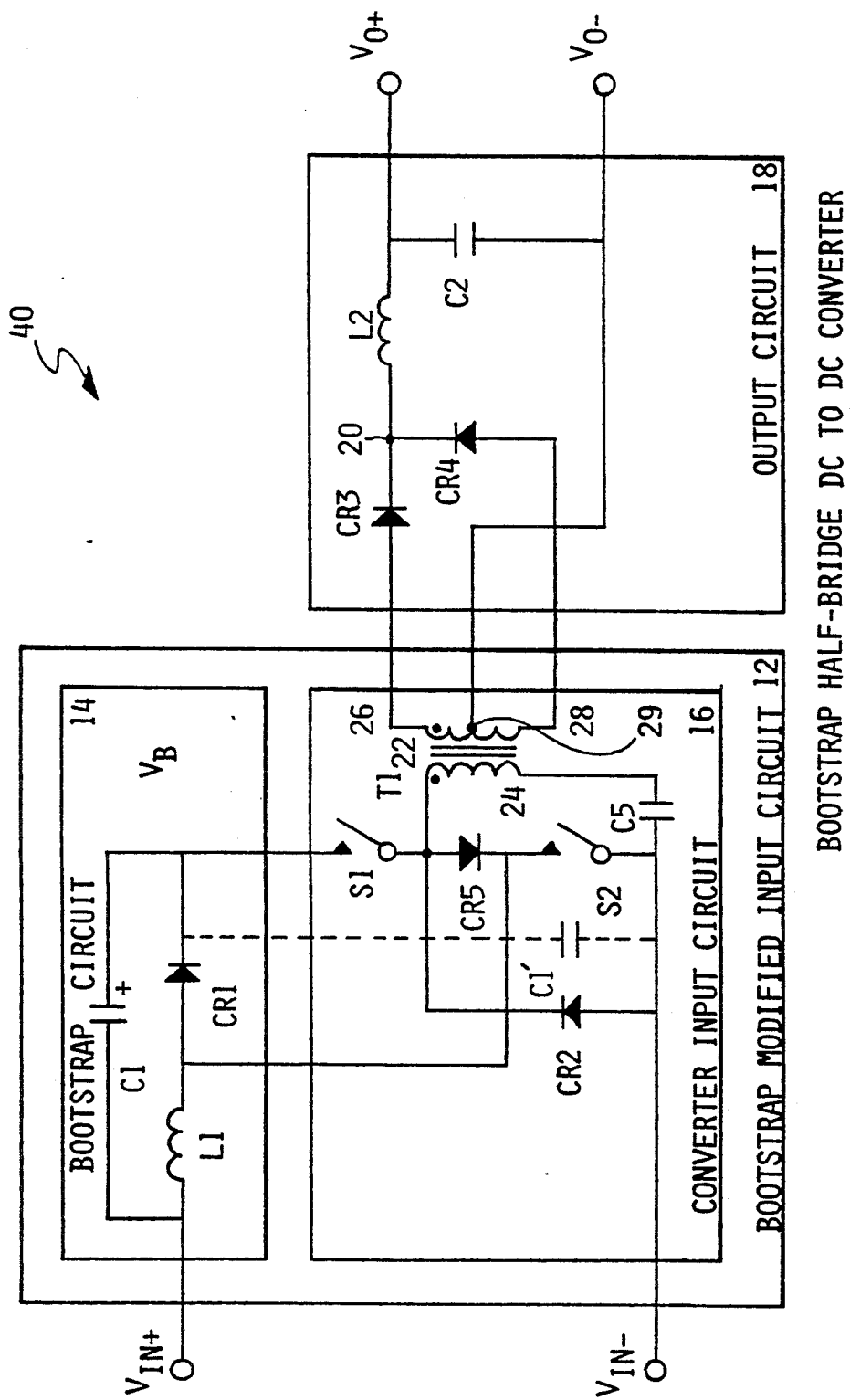
FIG. 6 is a schematic diagram illustrating the bootstrap half-bridge DC to DC converter embodiment of the present invention.
Figure 7:
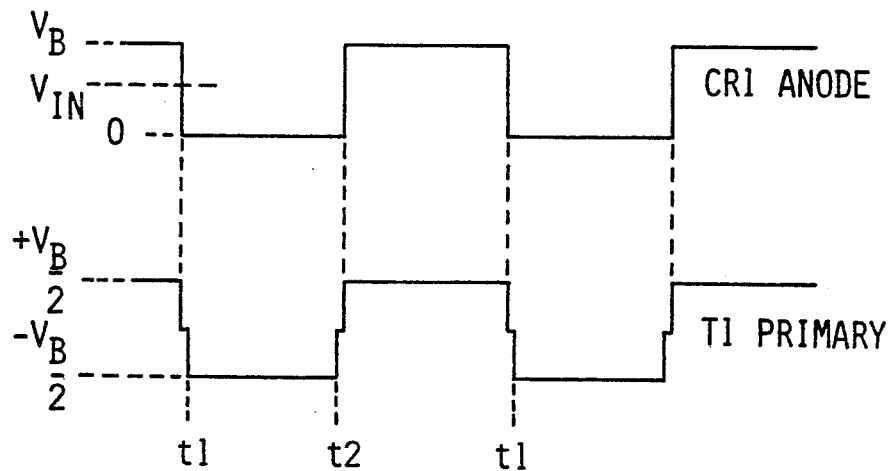
FIG. 7 illustrates typical low line operating waveform diagrams for the embodiment of FIG. 6.
Figure 8:
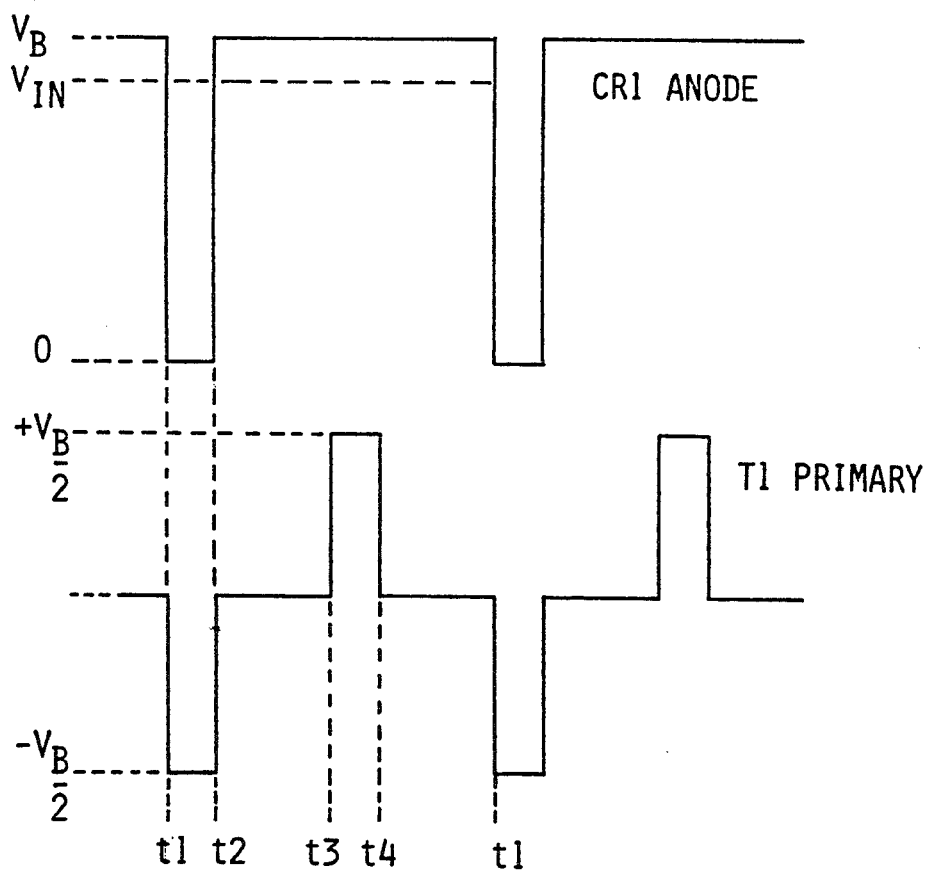
FIG. 8 illustrates typical high line operating waveform diagrams for the embodiment of FIG. 6.

The second embodiment of the invention is the bootstrap halfbridge DC to DC converter 40 which is shown in FIG. 6 and its applicable waveforms shown in FIGS. 7 and 8. This second embodiment as with the first embodiment is also comprised of a bootstrap modified input circuit 12 and a output circuit 18. The circuit 12 consists of a bootstrap circuit 14 that is identical to the circuit 14 of the first embodiment and includes a bootstrap inductor L1, a first rectifier CR1 and a bootstrap capacitor C1; the converter input circuit 16 includes a transformer T1, a pair of switches S1 and S2 and in addition to the first embodiment includes a second rectifier CR2 and a third rectifier CR5. The output circuit 18 is similar to the circuit 18 of the first embodiment and includes a back-to-back output rectifier consisting of rectifier CR3 and CR4, an output inductor L2 and an output capacitor C2.

As shown in FIG. 6, the input to the primary circuit 12 is $V_{IN+}$ and $V_{IN-}$ which is a rectified DC voltage supplied from a conventional AC voltage source.

In the bootstrap circuit 14 the components are identical and are connected as in the first embodiment, therefore they are not described. In the converter input circuit 16, the transformer's primary winding also has a first end 22 and second end 24 while the secondary winding has a first end 26, a second end 28 and a center tapped junction 29. The first switch S1 is connected in series between the transformer's first end 22 and the junction formed with the cathode of the first rectifier CR1 and the bootstrap capacitor C1. The second switch S2 is connected in series between the common input voltage $V_{IN-}$ and the cathode of a fifth rectifier CR5. The anode end of the rectifier CR5 is connected to the junction formed with the first switch S1 and the end 22 of the primary winding of transformer T1. At this same junction, is connected the cathode of the second rectifier CR2 with its anode connected to the $V_{IN-}$ line. Between the end 24 of the transformer's primary winding and $V_{IN-}$ is connected to the fifth capacitor C5.

In the terminal of the output circuit, that supplies $V_{0+}$ and $V_{0-}$, the $V_{0-}$ is connected to the center tap junction 29 on the secondary winding of the transformer T1. The output circuit also consists of a back-to-back output rectifier consisting of rectifiers CR3 and CR4. The cathode of both rectifiers form a junction 20 and the anode of the third rectifier CR3 is connected to the first end 26 of the secondary winding of transformer T1. The anode of the fourth rectifier CR4 is connected to the second end 28 of transformer T1. The output inductor L2 is connected in series between the cathode junction 20 and the output voltage line $V_{0+}$. To complete the circuit 18, the output capacitor C2 is connected across the DC output voltage terminals $V_{0+}$ and $V_{0-}$. The capacitor C2 function as an output storage and filtering capacitor and reduces high frequency ripple at the output.

In this embodiment, the switches S1 and S2 do not operate simultaneously, but rather operate for equal duty ratios but 180 degrees out of phase, as for a conventional half-bridge. The transformer T1 primary is energized through S1 and S2 and the T1 secondary consists of a center tapped winding 29 that is connected to the output line $V_{0-}$. The third and fourth rectifiers CR3 and CR4 feed the output inductor L2 which functions as an energy storage and averaging inductor, which supplies current to the load connected to the DC output terminals $V_{0+}$ and $V_{0-}$. Capacitor C2 provides a smoothing and energy storage function and filters high frequency noise and ripple from the output. Capacitor C5 is the half-bridge capacitor and in the conventional manner operates at an average voltage that is $\frac{1}{2}$ the input voltage to the primary winding of T1. Rectifiers CR1 and CR2 provide paths for clamping the voltage across the switches S1 and S2 when the switches turn off. As with the first embodiment of FIG. 1, capacitor C1' is an alternate connection for the bootstrap capacitor C1.

In operation, C5 becomes charged to a voltage that is essentially $\frac{1}{2}$ the bootstrap voltage VB which appears at the cathode of CR1. When switch S1 is closed, current flows from C1 through S1, then through the primary of T1 to capacitor C5. Rectifier CR5 remains reversed biased since conduction through L1 maintains CR1 at essentially VB. The current flowing in the secondary of T1 causes rectifier CR3 to become forward biased, which causes current flow in L1 which is then supplied to the $V_{0+}$ terminal. When S1 opens, current in the primary winding of T1 ceases. Residual energy in the primary (from sources such as leakage inductance) discharges through CR2 into C5. Current in L2 flows through both rectifiers CR3 and CR4 shorting T1 so that there is no voltage across it. Then, switch S2 closes, connecting the primary of T1 between C5 and common through CR5. Current now flows through the primary of T1 in the direction that forward biases rectifier CR4 causing current flow to increase in L2 in the conventional manner for a half-bridge. The closure of S2 also connects the anode of CR1 to the $V_{IN-}$ common, which causes the full input voltage $V_{IN+}$ to appear across L1, causing current to increase in L1. When S2 opens, the current flow in L1 forward biases CR1 and causes some of the energy stored in L1 to charge C1. Residual energy in the primary is discharged as current through the series combination of CR5 and CR1 into C1, thereby affording a clamping action which limits the voltage excursion on the switches.

FIGS. 7 and 8 illustrate the operating waveforms applicable to the embodiment of FIG. 6. FIG. 7 illustrates operating waveforms at minimum input voltage; FIG. 8 illustrates operating waveforms at and elevated input voltage. The upper waveform of FIG. 7 is the voltage on the CR1 anode. At t1, S2 closes and S1 opens. The C5 voltage appears across T1, and the CR1 anode is pulled to the input common $V_{IN-}$, causing L1 to charge. At t2, S2 opens and S1 closes, causing the reverse C5 voltage to appear across T1 and L1 to discharge into C1.

The upper waveform of FIG. 8 illustrates the CR1 anode voltage, clearly showing the superimposition of the bootstrap voltage on the increased input voltage. At time t1, S1 is open and S2 closes. L1 charges across the input voltage through S2, and ½ of the bootstrap voltage appears across the T1 primary winding. At t2, both S1 and S2 are open. L1 continues to discharge into C1, and the simultaneous conduction of rectifiers CR3 and CR4 causes zero voltage to appear in T1. At t3, S2 is open and S1 closes, causing ½ Vb to appear across T1. At t4, S1 opens and remains open until the next t1, when the operating cycle repeats.

Figure 9:
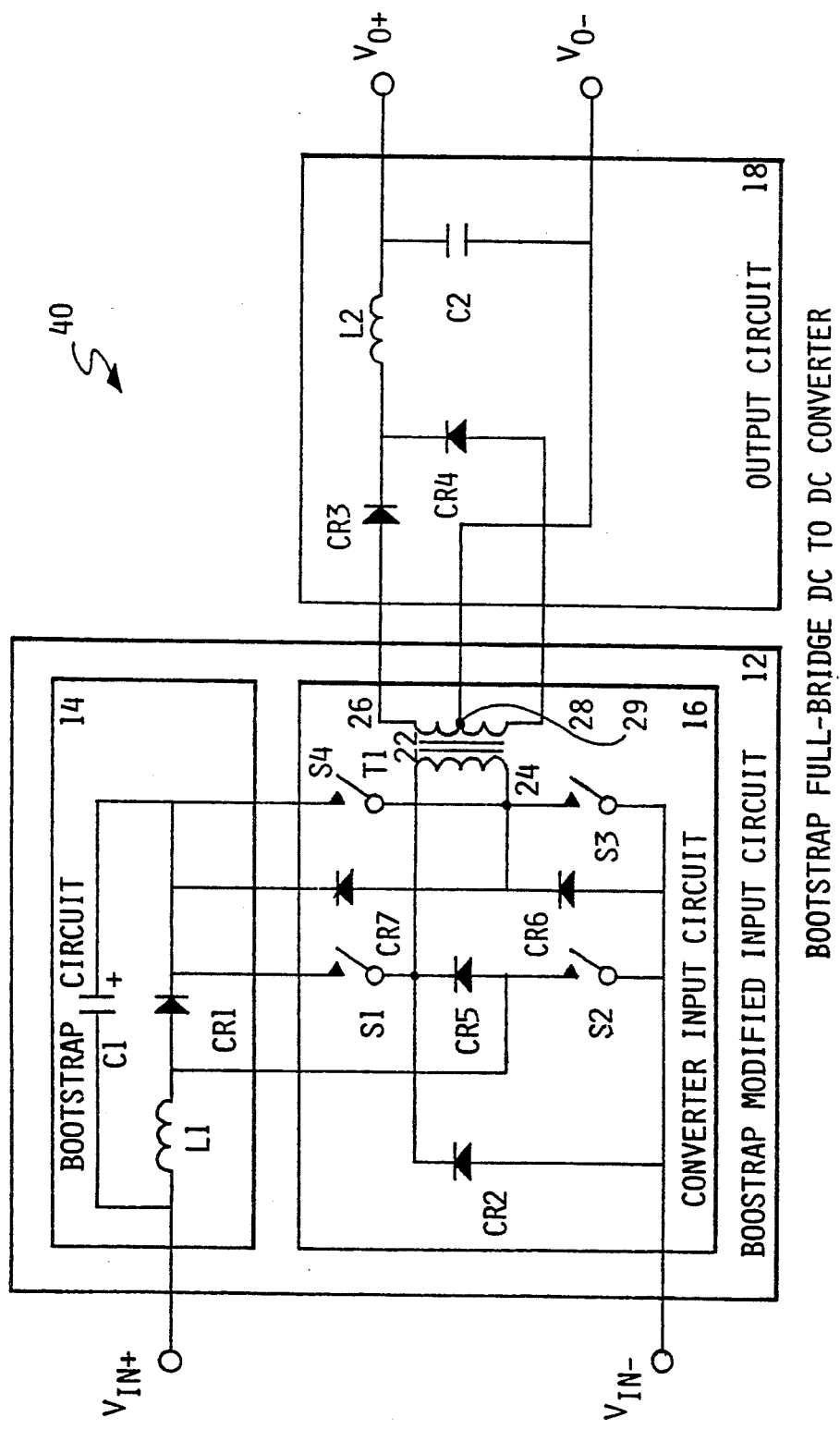
FIG. 9 is a schematic diagram illustrating the bootstrap full-bridge DC to DC converter embodiment of the present invention.

Note that the half-bridge DC to DC converter 40 of FIG. 6 can be converted to a full-bridge circuit/operation by modifying the component mix of the converter input circuit 16. As shown in FIG. 9, the modified circuit 16 has a transformer T1, a first switch S1, a second switch S2 and a second rectifier CR2 that are connected as previously described for the half-bridge DC to DC converter 40. In the modified circuit capacitor C5 is eliminated and a third and fourth switch S3 and S4 and a sixth and seventh rectifier CR6 and CR7 are added. The third switch S3 is connected in series between the second end 24 of the transformer T1 and $V_{IN-}$. The fourth switch S4 is connected in series between the second end 24 of the transformer T1 and the junction formed with the cathode of the first rectifier CR1 and the bootstrap capacitor C1. The sixth rectifier CR6 is connected between the second end 24 of transformer T1 and $V_{IN-}$; the seventh rectifier CR7 is connected to the cathode of the sixth rectifier CR6 and the junction formed with the cathode of the first rectifier CR1 and the bootstrap capacitor C1.

In the operation of the full-bridge circuit L1, CR1 and C1 continue to provide the bootstrap function. The switch pairs S1 and S3, switch pairs S2 and S4, rectifiers CR1 and CR6, and rectifiers CR2 and CR7 conduct simultaneously. The half-bridge capacitor C5 as shown in FIG. 6 is eliminated and the full bootstrap voltage $V_b$ is applied to the primary winding of transformer T1.

The third and final embodiment of the invention is the bootstrap-flyback DC-DC converter which is shown in FIGS. 10-20. In this embodiment, as with the previous two, the bootstrap circuit 14 is identical in form and function and includes a bootstrap inductor NPI, a first rectifier CR1 and a bootstrap capacitor C1. The converter input circuit includes a transformer T1 having a primary winding NP2 with a first end 22 and a second end 24, and a secondary winding NS1 also having a first end 26 and a second end 28, a switch S1, and an optional third capacitor C3. The output circuit 18 includes a rectifier CR2 and an output capacitor C2.

Figure 10:
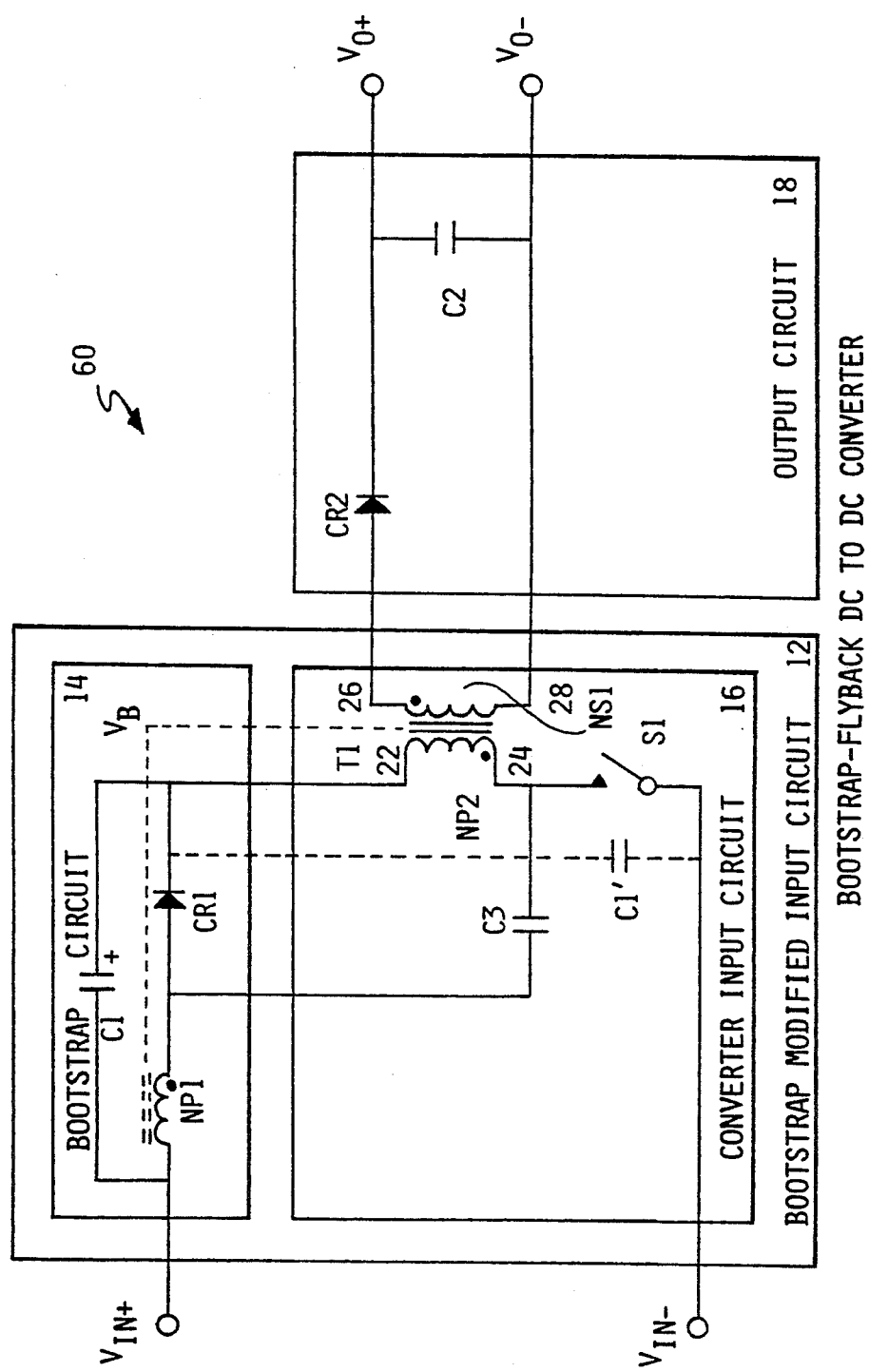
FIG. 10 is a schematic diagram illustrating the bootstrap-flyback DC to DC converter embodiment of the present invention.

As shown in FIG. 10, the single switch S1 is connected in series between the second end of the primary winding of the transformer T1 and the common input voltage $V_{IN-}$. The first end of the transformer's primary is connected to the junction formed with the cathode of the first rectifier CR1 and the bootstrap capacitor C1. The third capacitor C3 has one end connected to the junction formed with the second end of the primary of the transformer T1 and the switch S1 and the junction formed with the anode of the first rectifier CR1 and the bootstrap inductor NP1 which is derived from a duplicate primary winding NP1.

As with conventional flyback type converters, T1 functions as an inductor for storage of energy that is released to the converter output for driving a load. The secondary winding Ns1 of T1 is rectified by CR2 to supply the output storage and filter capacitor C2 with current to drive a load connected at output terminals $V_{0+}$ and $V_{0-}$. The inductor which consists of a winding Np1 on the transformer T1 is placed in series with Np2 through the bootstrap rectifier CR1. Windings Np1 and Np2 are preferably of equal number of turns, and closely coupled to one another magnetically. The capacitor C3 is not required for the invention to operate properly, however, it is included in this embodiment since it affords a moderate but significant advantage in realizing the optimum benefits of the invention.

In operation, switch S1 closes, causing the bootstrap voltage Vb to appear across windings Np2 of T1. The coupling of Np1 and Np2 causes the anode end of Np1 to go negative, the total voltage across Np1 being equal to Vb. This causes the anode of CR1 to go negative with respect to common for any input voltage greater than minimum. With S1 closed, current flow through Np2 charges T1. With S1 closed, rectifier CR1 is reverse biased, so current to the load at $V_{0+}$ is supplied through the output storage capacitor C2. When S1 opens, the polarity of all T1 windings reverses as the T1 flux field begins to collapse. CR2 becomes forward biased, and current flows from the secondary winding NS1 through CR2 to the load. The voltage induced on Np1 causes C1 to become charged to a voltage above the input voltage $V_{IN+}$ by an amount given by the output voltage $V_{0+}$ times the turns ratio between Ns1 and Np1. Because Np1 and Np2 are closely coupled, any residual energy present in the primary which cannot be released into the secondary (due primarily to leakage inductance) will discharge into Np1 and charge C1. This action provides very good clamping, preventing a leakage inductance over voltage from stressing S1. This flyback version of the bootstrap principle can be operated advantageously in the continuous or discontinuous conduction modes. As with the other embodiments, bootstrap capacitor C1 may be repositioned to C1' without changing the fundamental operation of the invention.

Figure 11:
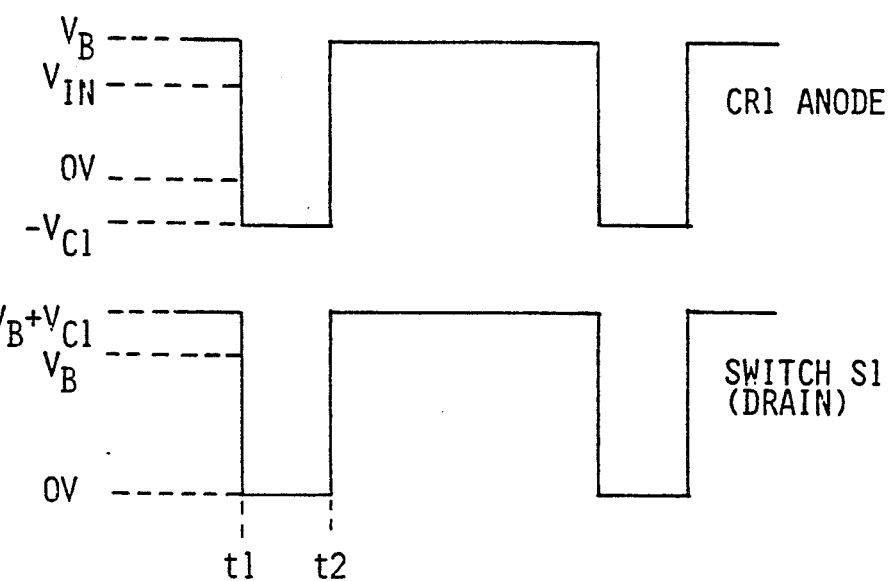
FIG. 11 illustrates typical low line operating waveform diagrams for the embodiment of FIG. 10.
Figure 12:
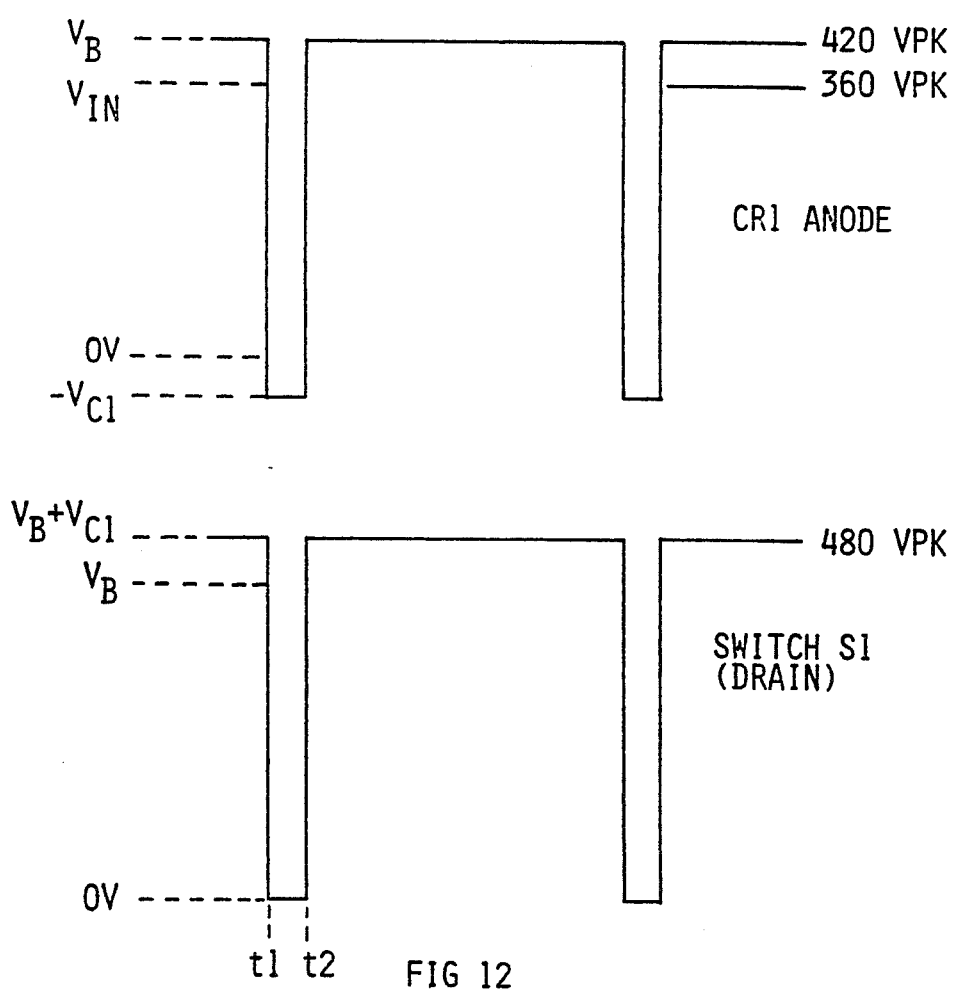
FIG. 12 illustrates typical high line operating waveform diagrams for the embodiment of FIG. 10.

FIGS. 11 and 12 illustrate operating waveforms of the invention at lower and higher input voltages, respectively. The upper waveform of FIG. 11 illustrates the voltage at the anode of CR1. At time t1, switch S1 closes, and the induced voltage on Np1 forces the anode negative below the return. At t2, switch S1 opens and the induced voltage on Np1, forward biases CR1 to charge C1, causing the anode to rise to Vb. The lower waveform illustrates closure of S1 at t1, connecting the T1 primary to common. At t2, switch S1 opens, and its voltage increases to Vb plus the voltage induced on Np2.

The upper waveform of FIG. 12 illustrates the increase of voltage on CR1 and S1 for increased input voltage. Again, it is observed that the increase in voltage stress on the components is minimized since Vb is clamped to the turns ratio reflected output voltage.

Figure 13:
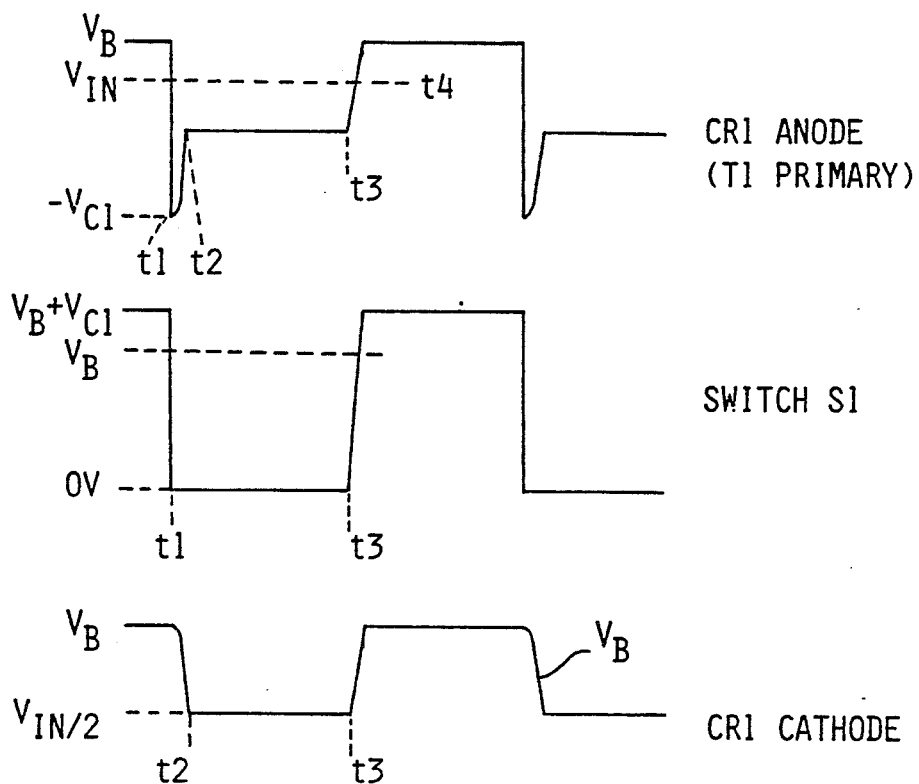
FIG. 13 illustrates typical low line operating waveform diagrams for the embodiment of FIG. 10.
Figure 14:
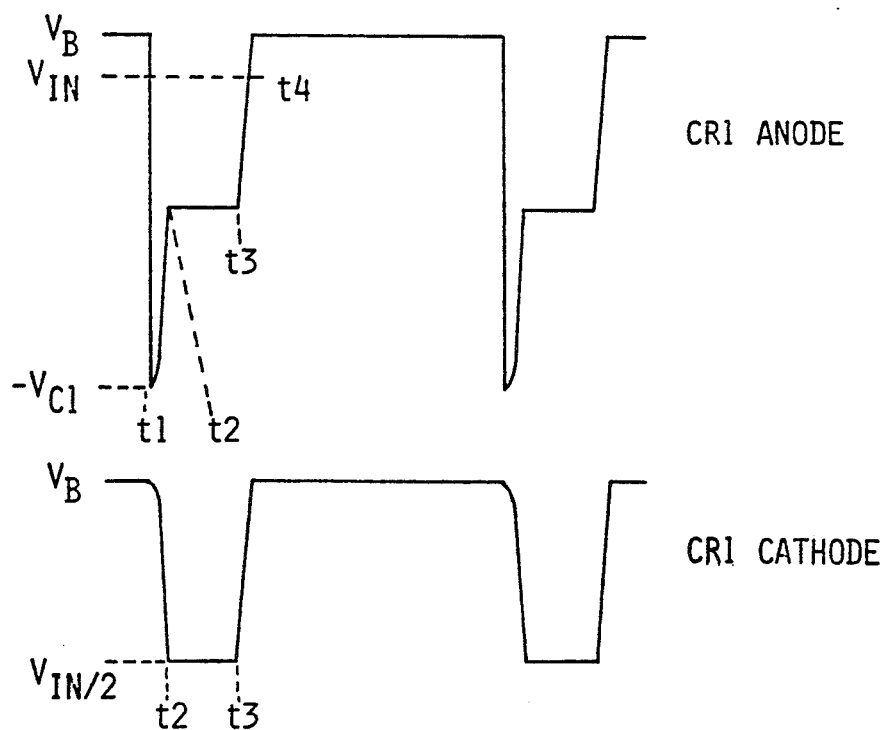
FIG. 14 illustrates typical high line operating waveform diagrams for the embodiment of FIG. 10.

A particularly advantageous operation of the bootstrap-flyback DC to DC converter 60 can be realized if the value of C1 is dramatically reduced to where only a very small fraction of the energy for each cycle is stored in C1. With this low value of capacitance, a loss-free snubbing effect for the primary can be achieved, as illustrated by the waveforms of FIGS. 13 and 14. In FIG. 13, the upper waveform illustrates the voltage at the anode of CR1. At t1, switch S1 closes. C1 discharges semi-resonantly into T1 through Np2, delivering its energy into T1. This causes the voltage Vb to drive the CR1 cathode negative. As C1 discharges, Vb decreases rapidly. At t2, capacitor C1 has discharged to a voltage such that Vb is equal to $\frac{1}{2}$ of $V_{IN}$, at which time CR1 becomes forward biased and current now flows through Np1, CR1, and Np2 to load additional energy into T1. The middle waveform of FIG. 13, shows S1 closure pulling Np2 to common potential. The lower waveform illustrates the discharge of C1 as the CR1 cathode discharges from VB to $\frac{1}{2}$ $V_{in}$. At time t3, switch S1 opens and the cathode of CR1 ramps up to voltage VB as C1 charges. The anode of CR1 tracks the cathode, since CR1 is forward biased when C1 is charging. The upper and lower waveforms of FIG. 14 illustrate the same circuit points as the upper and lower waveforms of FIG. 13, except the input voltage has been increased to a higher value. Note that the waveshapes are essentially the same, except for a higher absolute value. The discharge of C1 at time t1 is clear from the FIGURE, and at time t2 the voltage stabilization from Vb reaching $\frac{1}{2}$ $V_{IN}$ is clear.

FIGS. 15 through 20 illustrate a timing diagram of waveforms of various circuit points for the reduced C1 capacitance lossless snubbing version of the invention as described immediately above, for the condition when the converter is operated in the continuous conduction mode.

FIG. 15 illustrates that capacitor C1 discharges quickly beginning at t1 through t2, and that the voltage across Np1 and Np2 rapidly reaches a voltage value of $\frac{1}{2}$ $V_{IN}$. When S1 opens, Np1 forward biases CR1 and the voltage across Np1 rises to its high value.

FIG. 16 illustrates the cathode of CR1 as C1 discharges to $\frac{1}{2}$ $V_{IN}$ at t2, and remains there as T1 charges until t3 when S1 opens. At t3, the CR1 cathode tracks the increasing C1 voltage as C1 is charged by the voltage induced on Np1.

FIG. 17 illustrates the current through switch S1 at light converter loads. Note at t1 there is a spike of current as C1 discharges. Then, at t2, the C1 discharge current spike disappears and the characteristic inductor charging ramp predominates as the T1 inductance charges. At t3, S1 opens and the S1 current commutates immediately to zero.

FIG. 18 illustrates the current in CR1 at the same light load as for the S1 current in FIG. 17. In FIG. 18, time t2 marks the commencement of current flow through CR1 just as C1 has discharged to $\frac{1}{2}$ $V_{IN}$. The current commences from a value equal to $\frac{1}{2}$ the current that was flowing in Np2 when CR1 became forward biased as the primary inductance instantly increases by a factor of 4.

FIG. 19 illustrates current through S1 at full converter design load, continuous conduction mode. The C1 discharge spike is not conspicuous, since it is not a large component of the total current at full continuous conduction load. However, the leakage inductance between Np2 and Ns1 causes the load current to ramp at a distinct slope, as opposed to an immediate appearance of full load current. This illustrates the ability of a converter to advantageously employ leakage inductance to control noise associated with rapid changes in current. In a converter employing the bootstrap circuit of the present invention, the disadvantages of energy waste due to leakage inductance are eliminated due to the action of C1, thus allowing the converter to be advantageously designed with a desired amount of leakage inductance to control noise.

FIG. 20 illustrates the current through CR1 at full load, showing that at t2 the winding Np1 begins conducting the current flowing through winding Np2. At t3 switch S1 opens, but current continues to flow through CR1 as C1' charges, until the point t4, where C1' has charged to VB. At this point, current in CR1 ceases.

While the invention has been described in complete detail and pictorially shown in the accompanying drawings, it is not to be limited to such details, since many changes and modifications may be made to the invention without departing from the spirit and the scope thereof. For example, in addition to its wider input range capabilities, the invention is also applicable for a specific or narrow input range. Hence, it is described to cover any and all modifications and forms which may come within the language and scope of the claims.

I claim:

1. A bootstrap topology for wide-input range switch-mode DC to DC converters configured as a bootstrap-forward DC to DC converter comprising:
   a) a bootstrap modified input circuit further comprising:
      (1) a set of input terminals that receive a DC input voltage $V_{IN+}$ and $V_{IN-}$ from a DC voltage source,
      (2) a bootstrap circuit comprising:
         (a) a bootstrap inductor connected in series between the input voltage line $V_{IN+}$ and the anode of a first rectifier,
         (b) a bootstrap capacitor connected across the $V_{IN+}$ input line of said bootstrap inductor and the cathode of said first rectifier,
      (3) a converter input circuit comprising:
         (a) a transformer having a primary winding with a first end and a second end and a secondary winding also having a first end and a second end,
         (b) a first switch connected in series between the first end of the primary winding of said transformer and the junction formed with the cathode of said first rectifier and said bootstrap capacitor,
         (c) a second switch connected in series between the second end of the primary winding of said transformer and the input voltage line $V_{IN-}$, and
         (d) a second rectifier connected between the first end of the primary of said transformer and the input voltage line $V_{IN-}$, b) an output circuit comprising:
  (1) an output terminal that supplies a DC output voltage $V_{O+}$ and $V_{O-}$, where $V_{O-}$ is connected to the second end of the secondary winding of said transformer,
  (2) a back-to-back output rectifier consisting of a third rectifier and a fourth rectifier where the cathodes of both rectifiers form a junction and the anode of the third rectifier is connected to the first end of the secondary winding of said transformer and the anode of the fourth rectifier is connected to the second end of the secondary winding of said transformer which is also connected to the output voltage line $V_{O-}$,
  (3) an output inductor connected in series between the cathode junction of said third and fourth rectifiers and the output voltage $V_{O+}$, and
  (4) an output capacitor connected across the DC output voltage $V_{O+}$ and $V_{O-}$.

2. The converter as specified in claim 1 wherein the combination of said bootstrap inductor, said first rectifier and said bootstrap capacitor provide the bootstrap function.

3. The converter as specified in claim 2 wherein said bootstrap inductor is sized to have an energy storage capacity to provide sufficient current to said bootstrap capacitor.

4. The converter as specified in claim 1 wherein said first and second switches are comprised of transistors.

5. The converter as specified in claim 1 further comprising a control circuit means that determines the duty cycle of said first and second switches for the purpose of regulating the output voltage of said converter to an essentially fixed value.

6. The converter as specified in claim 5 wherein said control circuit means comprises:
  a) an error amplifier that senses the output voltage of said converter and compares it to a reference voltage where if the output voltage varies said error amplifier sends a correction signal,
  b) an isolating device that receives the correction signal and re-applies the correction signal to a pulse width modulator where the duty cycle of said first and second switches are increased or decreased to correct the error and maintain the output voltage constant.

7. The converter as specified in claim 1 wherein said converter has the means to reduce the voltage stress on said output rectifiers while the input voltage varies over a wide range.

8. A bootstrap topology for wide-input range switchmode DC to DC converters configured as a bootstrap half-bridge DC to DC converter comprising:
  a) a bootstrap modified input circuit further comprising:
    (1) a set of input terminals that receive a DC input voltage $V_{IN+}$ and $V_{IN-}$ from a DC voltage source,
    (2) a bootstrap circuit comprising:
      (a) a bootstrap inductor connected in series between the input voltage line $V_{IN+}$ and the anode of a first rectifier,
      (b) a bootstrap capacitor connected across the $V_{IN+}$ input line of said bootstrap inductor and the cathode of said first rectifier,
    (3) a converter input circuit comprising:
      (a) a transformer having a primary winding with a first end and a second end and a secondary winding also having a first end and a second end,
      (b) a first switch connected in series between the first end of the primary winding of said transformer and the junction formed with the cathode of said first rectifier and said bootstrap capacitor,
      (c) a second switch connected in series between the common input voltage $V_{IN-}$ and the cathode of a fifth rectifier, where the anode of said fifth rectifier is connected to the junction formed with said first switch and the first end of the primary winding of said transformer,
      (d) a second rectifier having its cathode connected between the junction formed with said first switch and the first end of the primary winding of said transformer and its anode connected to $V_{IN-}$,
      (e) a capacitive means for connecting the second end of the primary winding of said transformer to said DC input voltage,
  b) an output circuit comprising:
    (1) an output terminal that supplies a DC output voltage $V_{O+}$ and $V_{O-}$, where $V_{O-}$ is connected to the center tap on the secondary winding of said transformer,
    (2) a back-to-back output rectifier consisting of a third rectifier and a fourth rectifier where the cathodes of both rectifiers form a junction and the anode of the third rectifier is connected to the first end of the secondary winding of said transformer and the anode of the fourth rectifier is connected to the second end of the secondary winding of said transformer which is also connected to the output voltage line $V_O$,
    (3) an output inductor connected in series between the cathode junction of said third and fourth rectifiers and the output voltage $V_{O+}$, and
    (4) an output capacitor connected across the DC output voltage $V_{O+}$ and $V_{O-}$.

9. The converter as specified in claim 8 wherein the combination of said bootstrap inductor, said first rectifier and said bootstrap capacitor provide the bootstrap function.

10. The converter as specified in claim 8 wherein said first and second switches are comprised of transistors.

11. The converter as specified in claim 8 further comprising a control circuit means that determines the duty cycle of said first and second switches for the purpose of regulating the output voltage of said converter to an essentially fixed value.

12. The converter as specified in claim 8 wherein said converter has the means to reduce the voltage stress on said output rectifiers while the input voltage varies over a wide range.

13. The converter as specified in claim 8 wherein said converter input circuit is modified to allow operation as a full bridge circuit, said modified circuit comprising:
  a) a transformer having a primary winding with a first end and a second end and a secondary winding also having a first end and a second end,
  b) a first switch connected in series between the first end of the primary winding of said transformer and the junction formed with the cathode of said first rectifier and said bootstrap capacitor,
  c) a second switch connected in series between the common input voltage $V_{IN-}$ and the cathode of a fifth rectifier, where the anode of said fifth rectifier is connected to the junction formed with said first switch and the first end of the primary winding of said transformer, d) a second rectifier having its cathode connected between the junction formed with said first switch and the first end of the primary winding of said transformer and its anode connected to $V_{IN-}$, e) a third switch connected in series between the second end of the primary winding of said transformer and $V_{IN-}$, f) a fourth switch connected in series between the first end of the primary winding of said transformer and the junction formed with the cathode of said first rectifier and said bootstrap capacitor, g) a sixth rectifier connected between the second end of the primary winding of said transformer and the $V_{IN-}$, and h) a seventh rectifier connected to the cathode of said sixth rectifier and the junction formed with the cathode of said first rectifier and said bootstrap capacitor.

14. A bootstrap topology for wide-input range switch mode DC to DC converters configured as a bootstrap-flyback DC to DC converter comprising:

a) a bootstrap modified input circuit further comprising:

(1) a set of input terminals that receives a DC input voltage $V_{IN+}$ and $V_{IN-}$ from a DC voltage source means, (2) a bootstrap circuit comprising:

(a) a bootstrap inductor, connected in series between the input voltage line $V_{IN+}$ and the anode of a first rectifier, (b) a bootstrap capacitor connected across the $V_{IN+}$ input line of said bootstrap inductor and the cathode of said first rectifier, (3) a converter input circuit comprising:

(a) a transformer having a primary winding with a first end and a second end and a secondary winding also having a first end and a second end, (b) a switch connected in series between the second end of the primary winding of said transformer and common input voltage $V_{IN-}$, where the first end of the primary of said transformer is connected to the junction formed with the cathode of said first rectifier and said bootstrap capacitor, (c) an optional capacitor having one end connected to the junction formed with the second end of the primary of said transformer and said switch and the junction formed with the anode of said first rectifier and said bootstrap inductor, b) an output circuit comprising:

(1) an output terminal that supplies a DC output voltage $V_{O+}$ and $V_{O-}$, where $V_{O-}$ is connected to the second end of the secondary winding of said transformer, (2) an output rectifier having its anode connected to the first end of the secondary of said transformer and its anode to the $V_{O+}$ line, and (3) an output capacitor connected across the DC output voltage $V_{O+}$ and $V_{O-}$.

15. The converter as specified in claim 14 wherein the combination of said bootstrap inductor, said first rectifier and said bootstrap capacitor provide the bootstrap function where said inductor is derived from a duplicate primary winding of said transformer.

16. The converter as specified in claim 14 wherein said converter can be operated advantageously in the continuous or discontinuous conduction modes.

* * * * *